United States Patent Office 3,773,861
Patented Nov. 20, 1973

3,773,861
O-PHENYL-N-ALKOXY-(THIONO)-PHOSPHORIC (PHOSPHONIC) ACID ESTER AMIDES
Wolfgang Hofer, Wuppertal-Elberfeld, Ingeborg Hammann, Cologne, Bernhard Homeyer, Opladen, and Wilhelm Stendel, Wuppertal-Elberfeld, Germany, assignors to Bayer Aktiengesellschaft, Leverkusen, Germany
No Drawing. Filed Aug. 17, 1972, Ser. No. 281,361
Claims priority, application Germany, Sept. 1, 1971, P 21 43 756.9
Int. Cl. A01n 9/36; C07f 9/24
U.S. Cl. 260—949      7 Claims

ABSTRACT OF THE DISCLOSURE

O - phenyl-N-alkoxy-(thiono)-phosphoric(phosphonic) acid ester amides of the formula:

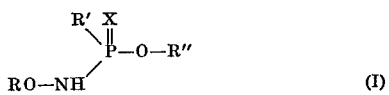

(I)

in which

R is alkyl with 1 to 6 carbon atoms,
R' is alkyl or alkoxy with 1 to 6 carbon atoms,
R'' is phenyl optionally substituted by at least one of halogen, nitro, cyano, lower alkyl, alkoxy, carbalkoxy and alkylmercapto with 1 to 6 carbon atoms, and
X is oxygen or sulfur, which possess insecticidal, acaricidal, nematocidal, fungicidal and bactericidal properties.

The present invention relates to and has for its objects the provision of particular new O-phenyl-N-alkoxy-(thiono)-phosphoric(phosphonic) acid ester amides, i.e., O-alkyl-O-phenyl-N-alkoxy-phosphoric acid ester amides, O-phenyl-N-alkoxy-alkanephosphonic acid ester amides and their thiono analogues, which possess insecticidal, acaricidal, nematocidal, fungicidal and bactericidal properties, active compositions in the form of mixtures of such compounds with solid and liquid dispersible carrier vehicles, and methods for producing such compounds and for using such compounds in a new way especially for combating pests, e.g. insects, acarids, nematodes, fungi and bacteria, with other and further objects becoming apparent from a study of the within specification and accompanying examples.

It is known from German published specification DAS 1,142,605 that O-phenyl-N,N-dialkyl-thiono-phosphonic acid ester amides, such as O-(3-methyl-4-methyl-mercapto-(Compound A) or 2-chloro-4-tert.-butyl-(Compound B) or 2,4 - dichlorophenyl)-N,N-dimethyl-thionoethanephosphonic acid ester amide (Compound C), possess insecticidal properties. Furthermore, O,O-diphenyl-N-methoxyphosphoric acid ester amide (Compound D) has already been described in the literature by Cates, J. Med. Chem., vol. 11 (1968), No. 2, pages 382–383.

The present invention provides O-phenyl-N-alkoxy-(thiono)-phosphoric(phosphonic) acid ester amides of the formula:

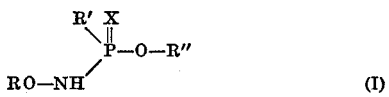

(I)

in which

R is alkyl with 1 to 6 carbon atoms,
R' is alkyl or alkoxy with 1 to 6 carbon atoms,
R'' is phenyl optionally substituted by at least one of halogen, nitro, cyano, lower alkyl, alkoxy, carbalkoxy and alkylmercapto with 1 to 6 carbon atoms, and
X is oxygen or sulfur.

Preferably, in the Formula I, R is straight-chain or branched lower alkyl with 1 to 3 carbon atoms, R' is straight-chain or branched lower alkyl or alkoxy with 1 to 4 carbon atoms, and R'' is phenyl which is optionally substituted one or more times by chlorine, cyano, methoxy, ethoxy, methylmercapto, ethylmercapto, straight or branched lower alkyl with 1 to 4 carbon atoms and carbo-lower alkoxy with 1 to 4 carbon atoms in the alkoxy moiety.

Surprisingly, the O - phenyl-N-alkoxy-(thiono)-phosphoric(phosphonic) acid ester amides according to the invention are distinguished, in comparison to previously known compounds of analogous structure, by higher insecticidal, especially soil-insecticidal, and acaricidal activity in addition to nematocidal, fungicidal and bactericidal action. Furthermore, the substances according to the invention have proved of value in combating ectoparasites in the veterinary field. They thus represent a genuine enrichment of the art.

The invention also provides a process for the production of an O-phenyl-N-alkoxy-(thiono)-phosphoric(phosphonic) acid ester amide of the Formula I in which an O-alkylhydroxylammonium chloride of the general formula:

RO—NH$_2$·HCl     (II)

in which R has the above-mentioned meaning, is reacted with (a) an O-phenyl-(thiono)-phosphoric(phosphonic) acid ester halide of the formula:

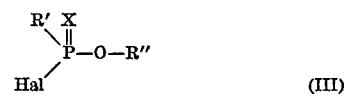

(III)

wherein

X, R' and R: have the above-mentioned meanings, and Hal is halogen, preferably chlorine, in the presence of an acid-binding agent, or (b) a (thiono)-phosphoric(phosphonic) acid ester dihalide or acid dihalide of the general formula

(IV)

in which R', X and Hal have the above-mentioned meanings, in the presence of an acid-binding agent and, without isolation of the intermediate product, the reaction mixture is subsequently treated with a phenol of the formula

HOR''     (V)

in which R'' has the above-mentioned meanings, in the presence of further acid-binding agent.

If O-n-propyl-hydroxylamine hydrochloride and O-n-butyl - O-(4-ethylmercapto-3-methyl-phenyl)-thionophosphoric acid ester chloride or O-n-propyl-hydroxylammonium chloride, O-n-butylphosphoric acid ester dichloride and 2,4-dichlorophenol are used as the starting materials, the courses of the reaction can be represented by the following formula schemes:

(a)
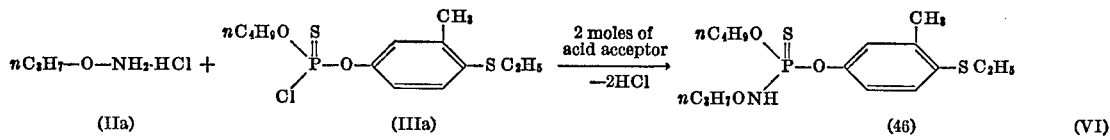

(b)
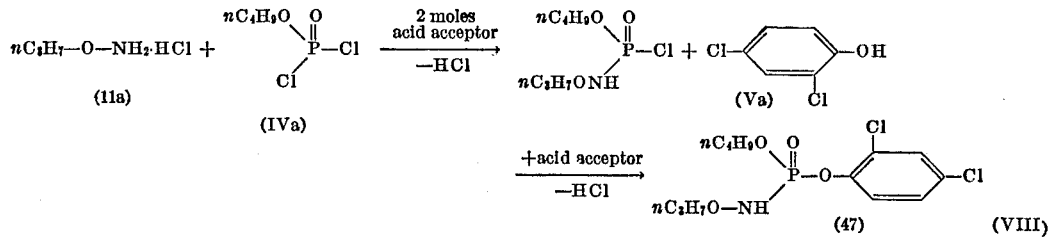

The O-alkylhydroxylammonium chlorides (II), O-phenyl-(thiono)-phosphoric(phosphonic) acid ester halides (III), (thiono)-phosphoric(phosphonic) acid ester dihalides or acid dihalides (IV) and phenols (V) required as starting substances have already been described in the literature and can be prepared in accordance with known processes, even on an industrial scale.

As examples of O-alkylhydroxylammonium chlorides (II) there may be mentioned: O-methyl-, O-ethyl-, O-n-propyl- and O-iso-propyl-hydroxyammonium chloride.

Examples of O-phenyl - (thiono) - phosphoric(phosphonic) acid ester halides (III) and (thiono)-phosphoric (phosphonic) acid ester dihalides or acid dihalides (IV) include: O-methyl-, O-ethyl-, O-n-propyl-, O-iso-propyl-, O-n-butyl-, O-iso-butyl-, O-sec.-butyl- and O-tert.-butyl-O-phenyl- or -O-(4-cyanophenyl)-, -O-(2,4,5-trichlorophenyl)-, -O-(3-methyl-phenyl)-, -O-(3-ethylphenyl)-, -O-(3-propylphenyl)-, -O-(3-tert.-butyl-phenyl)-, -O-(2,6-dichlorophenyl)-, -O-(4 - chlorophenyl)-, -O-(2 - carbomethoxyphenyl)-, -O-(2 - carbethoxyphenyl)-, -O - (2 - carbopropoxyphenyl)-, -O-(2 - carbobutoxyphenyl)-, -O-(3-methyl - 4 - methylmercaptophenyl)-, -O-(3-ethyl-4-ethylmercaptophenyl)-, -O-(2,4 - dimethylmercapto-5-methylphenyl)-, -O-(3-methoxyphenyl)-, -O-(3-ethoxyphenyl)-, -O-(2-chloro-4-methylphenyl)-, -O-(2-chloro-4-ethylphenyl)-, -O-(2-chloro-4-tert.-butylphenyl)-phosphoric acid ester chloride and their thiono analogues as well as the corresponding O-(4-cyanophenyl)-, O-(4-chlorophenyl)-, O-(2,4,5-trichlorophenyl)-, 0-(3-methylphenyl)-, O-(3-ethylphenyl)-, O-(3-propylphenyl)-, O-(2-carbomethoxyphenyl)-, O-(2-carboethoxyphenyl)-, O - (2 - carboisopropoxyphenyl)-, O-(2-carbobutoxyphenyl)-, O-(3-methyl-4-methylmercaptophenyl)-, O-(2,4-dimethylmercaptophenyl)-, O-(2,4-dimethylmercapto-5-methylphenyl)-, O-(2-chloro-4-methylphenyl)-, -O-(2-chloro-4-ethylphenyl)-methane-, -ethane-, -n-propane-, -iso-propane-, -n-butane-, -iso-butane-, -sec.-butane-, and -tert.-butane-phosphonic acid ester chloride and their thiono analogues, and also methane-, ethane-, n-propane-, iso-propane-, n-butane-, iso-butane, sec.-butane and tert.-butanephosphonic acid dihalide and the corresponding thiono analogues, and also O-methyl-, O-ethyl-, O-n-propyl-, O-iso-propyl, O-n-butyl-, O-iso-butyl-, O-sec.-butyl- and O-tert.-butylphosphoric acid ester dichloride and the corresponding thiono analogues.

As examples of phenol derivatives (V) there may be mentioned: 2-, 3- and 4-chloro-, 2,4- and 2,6-dichloro-, 2,4,5 and 2,4,6-trichloro-, pentachloro-, 2-, 3- and 4-chloro-6-methyl-, 3-methyl-, 2,4,6-trichloro-5-methyl-, 2-ethyl-, 2-propyl-, 4-cyano-, 2,3-, 3,4- and 2,6-dimethyl-, 3,5-dimethyl, 4-chloro-, 2-tert.-butyl-, 2-iso-propyl-, 3-ethyl-5-methyl-, 2- and 3-methoxy-, 2-ethoxy-, 3-methyl-4-methylmercapto-, 3,5-dimethyl-4-methylmercapto-, 2-carbomethoxy-, 2-carboethoxy- and 2-carbisopropoxyphenol.

The reaction of both process variants is preferably carried out in the presence of a solvent or diluent. Practicaly all inert organic solvents can be used for this purpose. These include, above all, aliphatic and aromatic optionally chlorinated hydrocarbons such as benzene, toluene, xylene, benzine, methylene chloride, chloroform, carbon tetrachloride and chlorobenzene, ethers such as diethyl ether, dibutyl ether and dioxane, ketones such as acetone, methyl ethyl ketone, methyl isopropyl ketone and methyl isobutyl ketone, and nitriles such as acetonitrile and propionitrile.

All customary acid-binding agents can be used as acid acceptors. Alkali metal carbonates and alcoholates, such as sodium and potassium carbonate, methylate or ethylate, and also aliphatic, aromatic or heterocyclic amines, for example triethylamine, dimethylaniline, dimethylbenzylamine and pyridine, and also alkali metal hydroxides, have proved particularly suitable.

The reaction temperatures can be varied over a wide range. In general, the reaction is carried out at about 0 to 100, preferably about 0 to 45° C.

The reaction is generally carried out under normal pressure.

When carrying out the process variant (a), an approximately 10% excess of the hydroxylammonium component (II) is in most cases reacted with the phosphoric acid compound (III) in the presence of approximately 2 molar equivalents of acid acceptor, for example at 30 to 40° C. using one of the indicated solvents. After stirring for several hours at elevated temperatures, the mixture may be worked up in the usual manner.

In the process variant (b), the hydroxylammonium derivative (III), preferably in approximately 10% excess, and 2 molar equivalents of acid acceptor are added dropwise to the acid dihalide (IV), for example at 0 to 5° C., and the mixture is then treated with the phenol component (V), and a further molar equivalent of acid acceptor (relative to the acid dihalide) at room temperature, with stirring. The reaction mixture may be stirred for several hours at room temperature and may then be worked up in the usual manner.

The substances according to the invention are in most cases obtained in the form of colorless to slightly colored oils which cannot be distilled without decomposition but can be freed of the last volatile constituents, and can in this way be purified, by so-called "slight distillation," that is to say prolonged heating under reduced pressure at moderately elevated temperatures. The substances are especially characterized by the refractive index. Some of them, however, are obtained in a crystalline form with a sharp characteristic melting point.

As already mentioned, the new O-phenyl-N-alkoxy-(thiono)-phosphoric(phosphonic) acid ester amides are distinguished by an outstanding insecticidal, especially soil-insecticidal, and acaricidal activity towards plant, hygiene and storage pests and ectoparasites. They possess a good action against sucking and against biting insects and mites (Acarina). At the same time they display a low phytotoxicity and also display some nematocidal, fungicidal and bactericidal properties.

For these reasons, the compounds according to the invention may be successfully used as pesticides in plant protection and the protection of stored products, as well as in the hygiene and veterinary field.

To the sucking insects contemplated herein there belong, in the main, aphids (Aphidae) such as the green peach aphid (*Myzus persicate*), the bean aphid (*Doralis fabae*), the bird cherry aphid (*Rhopalosiphum padi*), the pea aphid (*Macrosiphum pisi*) and the potato aphid (*Macrosiphum solanifolii*), the currant gall aphid (*Cryptomyzus korschelti*), the rosy apple aphid (*Sappaphis mali*), the mealy plum aphid (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips (Thysanoptera), such as *Hercinothrips femoralis*, and bugs, for example the beet bug (*Piesma quadrata*), the red cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*; and the like.

In the case of the biting insects contemplated herein, above all there should be mentioned butterfly caterpillars (Lepidoptera) such as the diamond-back moth (*Plutella macaulipennis*), the gypsy moth (*Lymantria dispar*), the browntail moth (*Euproctis chrysorrhoea*) and tent caterpillar (*Malacosoma neustria*); further, the cabbage moth (*Mamestra brassicae*) and the cutworm (*Agrostis segetum*), the large white butterfly (*Pieris brassicate*), the small winter moth (*Cheimatobia brumata*), the green oak trotrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kühniella*) and greater wax moth (*Galleria mellonella*); and the like.

Also to be classed with the biting insects contemplated herein are beetles (Coleoptera), for example the granary weevil (*Sitophilus granarius=Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (*Bruchidius=Acanthoscelides obtectus*), the leather beetle (*Dermestes frischi*), the khapra beetle (*Trogoderma granarium*), the flour beetle (*Tribolium castaneum*), the northern corn billbug (*Calandra or Sitophilus zeamais*), the drugstore beetle (*Stegobium paniceum*), the yellow mealworm (*Tenebrio molitor*) and the saw-toothed grain beetle (*Oryzaephilus surinamensis*), and also species living in the soil, for example wireworms (*Agriotes spec.*) and larvae of the cockchafer (*Melolontha melolontha*); cockroaches, such as the German cockroach (*Blattella garmanica*), American cockroach (*Periplaneta americana*), Madeira cockroach (*Leucophaea or Rhyparobia maderae*), oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Acheta domesticus*); termites such as the eastern subterranean termite (*Reticulitermes fllavipes*) and Hymenoptera such as ants, for example the garden ant (*Lasius niger*); and the like.

The Diptera contemplated herein comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia regina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

With the mites (Acari) contemplated herein there are classed, in particular, the spider mites (Tetranychidae) such as the two-spotted spider mite (*Tetranychus telarius= Tetranychus althaeae or Tetranychus urticae*) and the European red mite (*Paratetranychus pilosus=Panonychus ulmi*), gall mites, for example the black currant gall mite (*Eriophyes ribis*) and tarsonemids, for example the broad mite (*Hemitarsonemus latus*) and the cyclamen mite (*Tarsonemus palladius*); finally, ticks, such as the relapsing fever tick (*Ornithodorus moubata*); and the like.

When applied against hygiene pests and pests of stored products, particularly flies and mosquitoes, the compounds of the invention are also distinguished by an outstanding residual activity on wood and clay, as well as a good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as Freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), cycloalkanes (e.g. cyclohexane, etc.), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), acetonitrile, ketones (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides, acaricides, nematocides, fungicides and bactericides, or rodenticides, herbicides fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g./hectare, preferably 40 to 600 g./hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. insects, acarids, fungi, bacteria and nematodes, and more particularly methods of combating at least one of insects and acarids, which comprises applying to at least one of correspondingly (a) such insects, (b) such acarids, (c) such nematodes, (d) such fungi, (e) such bacteria, and (f) the correspondingly habitat thereof, i.e., the locus to be protected, a correspondingly combative or toxic amount, i.e., an insecticidally, acaricidally, nematocidally, fungicidally or bactericidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1

Myzus test (contact action)
Solvent: 3 parts by weight of acetone
Emulsifier: 1 part by weight of alkylaryl-polyglycol-ether To produce a suitable preparation of active compound, 1 part by weight of the active compound is mixed with the stated amount of solvent containing the stated amount of emulsifier and the concentrate is diluted with water to the desired concentration.

Cabbage plants (*Brassica oleracea*) which have been heavily infested with peach aphids (*Myzus persicae*) are sprayed with the preparation of the active compound until dripping wet.

After the specified periods of time, the degree of destruction is determined as a percentage: 100% means that all the aphids are killed whereas 0% means that none of the aphids are killed.

The active compounds, the concentrations of the active compounds, the evaluation times and the results can be seen from the following Table 1:

TABLE 1
(Myzus test)

| | Active compounds | | Active compound concentration in percent | Degree of destruction in percent after 1 day |
|---|---|---|---|---|
| | 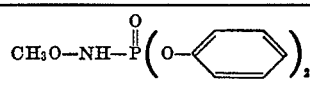 (known) | (D) | 0.1 | 0 |
| | 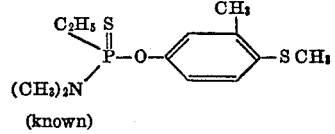 (known) | (A) | 0.1<br>0.01 | 40<br>0 |
| 18 | 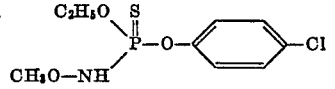 | | 0.1<br>0.01 | 100<br>60 |
| 35 | 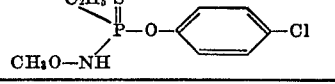 | | 0.1<br>0.01 | 100<br>100 |
| 33 | 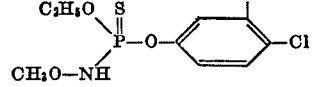 | | 0.1<br>0.01<br>0.001 | 100<br>100<br>65 |

TABLE 1—Continued

| | Active compounds | Active compound concentration in percent | Degree of destruction in percent after 1 day |
|---|---|---|---|
| 28 | $C_2H_5O$, $S$, $P$, $CH_3O-NH$, $O$-(2,6-Cl$_2$-phenyl) | 0.1<br>0.01 | 100<br>90 |
| 17 | $C_2H_5$, $S$, $P$, $CH_3O-NH$, $O$-(2,6-Cl$_2$-phenyl) | 0.1<br>0.01<br>0.001 | 100<br>95<br>70 |
| 34 | $CH_3O$, $S$, $P$, $CH_3O-NH$, $O$-(2,4-Cl$_2$-phenyl) | 0.1<br>0.01 | 108<br>100 |
| 36 | $C_2H_5O$, $S$, $P$, $CH_3O-NH$, $O$-(2,4-Cl$_2$-phenyl) | 0.1<br>0.01 | 109<br>90 |
| 25 | $C_2H_5$, $S$, $P$, $CH_3O-NH$, $O$-(2,4-Cl$_2$-phenyl) | 0.1<br>0.01 | 100<br>98 |
| 15 | $C_2H_5O$, $S$, $P$, $C_2H_5O-NH$, $O$-(3,4-Cl$_2$-phenyl) | 0.1<br>0.01 | 100<br>70 |
| 14 | $C_2H_5$, $S$, $P$, $CH_3O-NH$, $O$-(2,4,6-Cl$_3$-phenyl) | 0.1<br>0.01 | 98<br>90 |
| 12 | $C_2H_5$, $S$, $P$, $C_2H_5O-NH$, $O$-(2,4,5-Cl$_3$-phenyl) | 0.1<br>0.01 | 100<br>90 |
| 7 | $C_2H_5$, $S$, $P$, $CH_3O-NH$, $O$-(2,4,6-Cl$_3$-phenyl) | 0.1<br>0.01 | 100<br>70 |
| 6 | $C_2H_5$, $S$, $P$, $C_2H_5O-NH$, $O$-(2,4,6-Cl$_3$-phenyl) | 0.1<br>0.01 | 100<br>80 |
| 16 | $C_2H_5O$, $S$, $P$, $CH_3O-NH$, $O$-(2,4,5-Cl$_3$-phenyl) | 0.1<br>0.01 | 98<br>95 |
| 39 | $C_2H_5O$, $O$, $P$, $CH_3O-NH$, $O$-(2-Cl-4-C(CH$_3$)$_3$-phenyl) | 0.1<br>0.01 | 100<br>90 |
| 26 | $CH_3O$, $S$, $P$, $CH_3O-NH$, $O$-(3-CH$_3$-4-SCH$_3$-phenyl) | 0.1<br>0.01<br>0.001 | 100<br>99<br>45 |
| 1 | $C_2H_5O$, $S$, $P$, $CH_3O-NH$, $O$-(3-CH$_3$-4-SCH$_3$-phenyl) | 0.1<br>0.01<br>0.001 | 100<br>100<br>70 |

TABLE 1—Continued

| | Active compounds | Active compound concentration in percent | Degree of destruction in percent after 2 days |
|---|---|---|---|
| 45 | $C_2H_5O$, $O$, $CH_3O-NH$ \ P(=O)–O–C₆H₃(CH₃)(SCH₃) | 0.1<br>0.01 | 100<br>100 |
| 24 | $C_2H_5$, $S$, $CH_3O-NH$ \ P(=S)–O–C₆H₃(CH₃)(SCH₃) | 0.1<br>0.01<br>0.001 | 100<br>100<br>95 |
| 22 | $CH_3O$, $S$, $CH_3O-NH$ \ P(=S)–O–C₆H₄–CO–OCH(CH₃)₂ | 0.1<br>0.01 | 100<br>70 |
| 11 | $C_2H_5O$, $S$, $CH_3O-NH$ \ P(=S)–O–C₆H₄–CN | 0.1<br>0.01 | 100<br>85 |
| 10 | $C_2H_5O$, $S$, $C_2H_5O-NH$ \ P(=S)–O–C₆H₄–CN | 0.1<br>0.01 | 108<br>98 |

EXAMPLE 2

Tetranychus test (resistant)
Solvent: 3 parts by weight of acetone
Emulsifier: 1 part by weight of alkylaryl-poly-glycol-ether To produce a suitable preparation of active compound, 1 part by weight of the active compound is mixed with the stated amount of solvent containing the stated amount of emulsifier and the concentrate so obtained is diluted with water to the desired concentration.

Bean plants (*Phaseolus vulgaris*), which have a height of approximately 10–30 cm., are sprayed with the preparation of the active compound until dripping wet. These bean plants are heavily infested with the two-spotted spider mite (*Tetranychus urticae*) in all stages of development.

After the specified periods of time, the effectiveness of the preparation of active compound is determined by counting the dead mites. The degree of destruction thus obtained is expressed as a percentage: 100% means that all the spider mites are killed whereas 0% means that none of the spider mites are killed.

The active compounds, the concentrations of the active compounds, the evaluation times and the results can be seen from the following Table 2:

TABLE 2
(Tetranychus test) (resistant)

| | Active compounds | | Active compound concentration in percent | Degree of destruction in percent after 2 days |
|---|---|---|---|---|
| | $CH_3O-NH-P(=O)(O-C_6H_5)_2$ (known) | (D) | 0.1 | 0 |
| | $C_2H_5$, $S$, $(CH_3)_2N$ \ P–O–C₆H₃(CH₃)(SCH₃) (known) | (A) | 0.1<br>0.01 | 30<br>0 |
| 28 | $C_2H_5O$, $S$, $CH_3O-NH$ \ P(=S)–O–C₆H₃Cl₂ | | 0.1 | 90 |
| 17 | $C_2H_5$, $S$, $CH_3O-NH$ \ P(=S)–O–C₆H₃Cl₂ | | 0.1 | 90 |
| 36 | $C_2H_5O$, $S$, $CH_3O-NH$ \ P(=S)–O–C₆H₃Cl₂ | | 0.1 | 90 |

TABLE 2—Continued

| | Active compounds | Active compound concentration in percent | Degree of destruction in percent after 2 days |
|---|---|---|---|
| 7 | $C_2H_5$, S, P(=S)–O–(2,4,6-trichlorophenyl); $CH_3O–NH$ | 0.1 | 98 |
| 6 | $C_2H_5$, S, P(=S)–O–(2,4,6-trichlorophenyl); $C_2H_5O–NH$ | 0.1 | 100 |
| 39 | $C_2H_5O$, S, P(=S)–O–(2-Cl-4-C(CH$_3$)$_3$-phenyl); $CH_3O–NH$ | 0.1 | 95 |
| 26 | $CH_3O$, S, P(=S)–O–(2-CH$_3$-4-SCH$_3$-phenyl); $CH_3O–NH$ | 0.1 | 90 |
| 35 | $C_2H_5$, S, P(=S)–O–(4-Cl-phenyl); $CH_3O–NH$ | 0.1 | 99 |
| 1 | $C_2H_5O$, S, P(=S)–O–(2-CH$_3$-4-SCH$_3$-phenyl); $CH_3O–NH$ | 0.1 / 0.01 | 98 / 60 |
| 45 | $C_2H_5O$, O, P(=O)–O–(2-CH$_3$-4-SCH$_3$-phenyl); $CH_3O–NH$ | 0.1 | 98 |
| 3 | $C_2H_5$, S, P(=S)–O–(2-Cl-4-C(CH$_3$)$_3$-phenyl); $CH_3O–NH$ | 0.1 | 90 |
| 2 | $C_2H_5$, S, P(=S)–O–(2-Cl-4-C(CH$_3$)$_3$-phenyl); $C_2H_5O–NH$ | 0.1 | 98 |

EXAMPLE 3

Critical concentration test/soil insects
Test insect: *Phorbia brassicae*
Solvent: 3 parts by weight of acetone
Emulsifier: 1 part by weight of alkylaryl-polyglycol-ether To produce a suitable preparation of active compound, 1 part by weight of active compound is mixed with the stated amount of solvent, the stated amount of emulsifier is added and the concentrate is diluted with water to the desired concentration.

The preparation of active compound is intimately mixed with soil which is heavily infested with the test nematodes. The concentration of the active compound in the preparation is of practically no importance; only the amount of active compound per unit volume of soil, which is given in p.p.m., is decisive. The soil is filled into pots, lettuce is sown in and the pots are kept at a greenhouse temperature of 27° C. After 4 weeks, the lettuce roots are examined for infestation with nematodes, and the degree of effectiveness of the active compound is determined as a percentage. The degree of effectiveness is 100% when infestation is completely avoided; it is 0% when the infestation is exactly the same as in the case of the control plants in untreated soil which has been infested in the same manner.

The active compounds, the amounts applied and the results can be seen from the following Table 3:

fier, and the concentrate thus obtained is diluted with water to the desired concentration.

TABLE 3

(*Phorbia brassicae*/grubs in soil)

| Active compounds | Degree of destruction in percent at an active compound concentration of— | | | |
|---|---|---|---|---|
| | 20 p.p.m. | 10 p.p.m. | 5 p.p.m. | 2.5. p.p.m |
| 1. $C_2H_5O\diagdown\underset{\underset{CH_3O-NH}{\mid}}{\overset{\overset{S}{\parallel}}{P}}-O-\phenyl(CH_3,SCH_3)$ | 100 | 100 | 90 | 50 |
| 36. $C_2H_5O\diagdown\underset{\underset{CH_3O-NH}{\mid}}{\overset{\overset{S}{\parallel}}{P}}-O-\phenyl(Cl,Cl)$ | 100 | 100 | 50 | |
| 35. $C_2H_5\diagdown\underset{\underset{CH_3O-NH}{\mid}}{\overset{\overset{S}{\parallel}}{P}}-O-\phenyl(Cl)$ | 100 | 100 | 90 | 50 |
| 34. $CH_3O\diagdown\underset{\underset{CH_3O-NH}{\mid}}{\overset{\overset{S}{\parallel}}{P}}-O-\phenyl(Cl,Cl)$ | 100 | 100 | 50 | |
| 25. $C_2H_5\diagdown\underset{\underset{CH_3O-NH}{\mid}}{\overset{\overset{S}{\parallel}}{P}}-O-\phenyl(Cl,Cl)$ | 100 | 95 | 50 | |
| 24. $C_2H_5\diagdown\underset{\underset{CH_3O-NH}{\mid}}{\overset{\overset{S}{\parallel}}{P}}-O-\phenyl(CH_3,SCH_3)$ | 100 | 100 | 50 | |
| 33. $C_2H_5O\diagdown\underset{\underset{CH_3O-NH}{\mid}}{\overset{\overset{S}{\parallel}}{P}}-O-\phenyl(Cl,Cl)$ | 100 | 100 | 50 | |
| $C_2H_5O\diagdown\underset{C_2H_5O\diagup}{\overset{\overset{S}{\parallel}}{P}}-\underset{CH_3}{N}-SCCl_3$ (known) | (E) | 50 | 0 | |

EXAMPLE 4

Test with parasitary fly larvae
Solvent: 35 parts by weight of ethylene-polyglycol-monomethyl-ether
Emulsifier: 35 parts by weight of nonylphenol-polyglycol-ether In order to produce an appropriate preparation of active compound, 30 parts by weight of the active substance in question are mixed with the indicated amount of solvent which contains the abovementioned proportion of emulsi- About 20 fly larvae (*Lucilia cuprina*) are introduced into a test tube which contains about 2 cm.³ of horse muscle. 0.5 ml. of the active compound preparation are applied to this horseflesh. After 24 hours, the degree of destruction in percent is determined. Herein, 100% denotes that all larvae have been killed and 0% denotes that no larvae have been killed.

The active compounds examined, the concentrations tested and the results obtained are shown in Table 4 below:

TABLE 4

(Test with parasitary fly larvae)

| Active compounds | Active compound concentration in p.p.m. | Degree of destruction in percent (*Lucilia cuprina*) |
|---|---|---|
| 1. $C_2H_5O-\overset{\overset{S}{\parallel}}{\underset{\underset{NH-COH_3}{\mid}}{P}}-O-\phenyl(CH_3,SCH_3)$ | 300<br>30<br>3 | 100<br>100<br>100 |
| 37. $C_2H_5O-\overset{\overset{S}{\parallel}}{\underset{\underset{NH-OCH_3}{\mid}}{P}}-O-\phenyl(CH_3,SCH_3)$ | 300<br>100<br>30<br>10 | 100<br>100<br>>50<br>0 |

TABLE 4
(Test with parasitary fly larvae)

| Active compounds | | Active compound concentration in p.p.m. | Degree of destruction in percent (*Lucilia cuprina*) |
|---|---|---|---|
| 36 | $C_2H_5O-\underset{\underset{NH-OCH_3}{\|}}{\overset{\overset{S}{\|}}{P}}-O-\langle\text{2-Cl,4-Cl phenyl}\rangle$ | 300<br>100<br>30<br>10 | 100<br>100<br>>50<br>0 |
| 35 | $C_2H_5-\underset{\underset{NH-OCH_3}{\|}}{\overset{\overset{S}{\|}}{P}}-O-\langle\text{4-Cl phenyl}\rangle$ | 300<br>30<br>3 | 100<br>100<br>100 |
| 27 | $C_2H_5-\underset{\underset{NH-OCH_3}{\|}}{\overset{\overset{S}{\|}}{P}}-O-\langle\text{phenyl}\rangle$ | 300<br>100<br>30<br>10 | 100<br>100<br>>50<br>0 |
| 26 | $CH_3O-\underset{\underset{NH-OCH_3}{\|}}{\overset{\overset{S}{\|}}{P}}-O-\langle\text{3-CH}_3\text{,4-SCH}_3\text{ phenyl}\rangle$ | 300<br>100<br>30<br>10 | 100<br>100<br>100<br>0 |
| 25 | $C_2H_5-\underset{\underset{NH-OCH_3}{\|}}{\overset{\overset{S}{\|}}{P}}-O-\langle\text{2-Cl,4-Cl phenyl}\rangle$ | 300<br>100<br>30<br>10<br>3<br>1 | 100<br>100<br>100<br>100<br>100<br>0 |
| 24 | $C_2H_5-\underset{\underset{NH-OCH_3}{\|}}{\overset{\overset{S}{\|}}{P}}-O-\langle\text{3-CH}_3\text{,4-SCH}_3\text{ phenyl}\rangle$ | 300<br>30<br>3 | 100<br>100<br>0 |
| 33 | $C_2H_5O-\underset{\underset{NH-OCH_3}{\|}}{\overset{\overset{S}{\|}}{P}}-O-\langle\text{3-Cl,4-Cl phenyl}\rangle$ | 300<br>100<br>30<br>10<br>3 | 100<br>100<br>100<br>100<br>0 |
| 45 | $C_2H_5O-\underset{\underset{NH-OCH_3}{\|}}{\overset{\overset{O}{\|}}{P}}-O-\langle\text{3-CH}_3\text{,4-SCH}_3\text{ phenyl}\rangle$ | 300<br>30<br>3 | 100<br>100<br>0 |

EXAMPLE 5

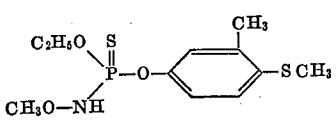

(1)

60 g. (0.44 mole) of potassium carbonate were suspended in 150 ml. of acetonitrile. 19 g. (0.22 mole) of O-methylhydroxylammonium chloride were added to this suspension, a solution of 59 g. (0.2 mole) of O-ethyl-O-(3-methyl - 4 - methylmercaptophenyl)-thiono- phosphoric acid diester chloride in 70 ml. of acetonitrile was subsequently added dropwise to the reaction mixture at 30 to 40° C., the mixture was stirred for a further 4 hours at 40° C., the solid constituents were filtered off, the solvent was removed under reduced pressure and the residue was taken up in 100 ml. of benzene. After washing with water and drying the benzene phase over sodium sulfate, the solvent was again stripped off under reduced pressure and the residue was subjected to "incipient" distillation at 0.1 mm. Hg and 80° C. 50 g. (82% of theory) of O-ethyl-O-(3-methyl-4-methylmercapto- phenyl)-N-methoxy-thionophosphoric acid ester amide were left in the form of a colorless oil of refractive index $n_D^{23}=1.5708$.
The following compounds were prepared by methods analogous to that of Example 5:
| | Compound | Physical properties (refractive index, melting point) | Yield (percent of theory) |
|---|---|---|---|
| 2 | 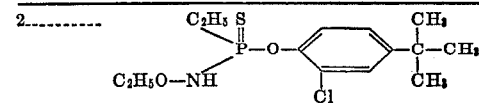 | $n_D^{21}=1.5378$ | 85 |
| 3 | 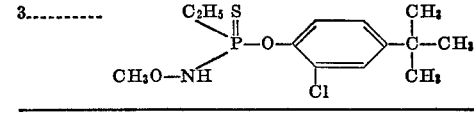 | $n_D^{21}=1.5470$ | 93 |
| 4 | 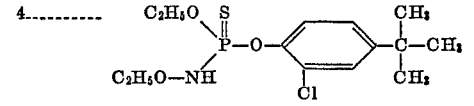 | $n_D^{21}=1.5262$ | 86 |
| 5 | 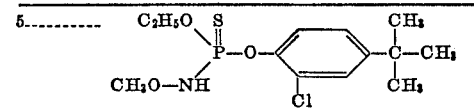 | $n_D^{21}=1.5338$ | 80 |
| 6 | 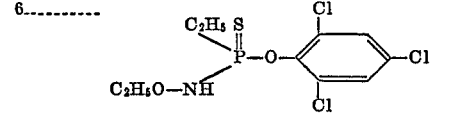 | Fp. 46–48° C. | 58 |
| 7 | 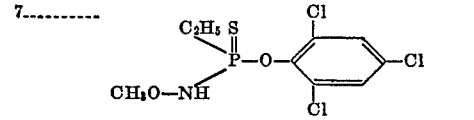 | Fp. 77–80° C. | 90 |
| 8 | 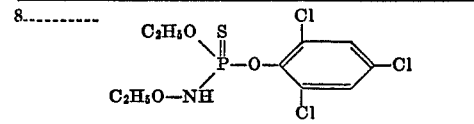 | $n_D^{25}=1.5523$ | 95 |
| 9 | 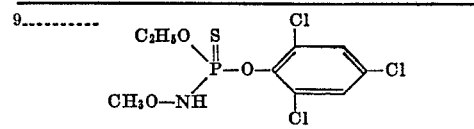 | $n_D^{25}=1.5618$ | 77 |
| 10 | 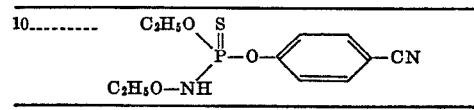 | $n_D^{24}=1.5576$ | 56 |
| 11 | 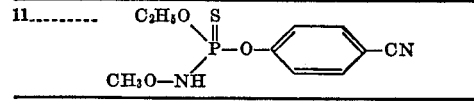 | $n_D^{24}=1.5572$ | 70 |
| 12 | 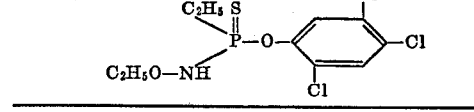 | Fp. 48° C. | 70 |
| 13 | 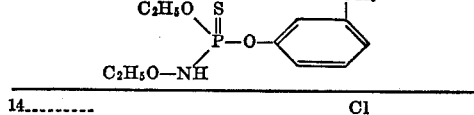 | $n_D^{24}=1.5279$ | 95 |
| 14 | 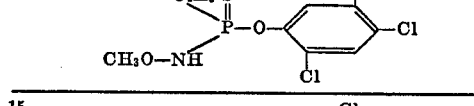 | Fp. 64° C. | 75 |
| 15 | 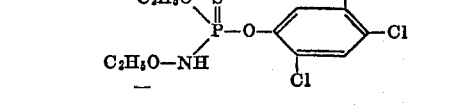 | $n_D^{24}=1.5572$ | 72 |

TABLE—Continued
| Compound | Physical properties (refractive index, melting point) | Yield (percent of theory) |
|---|---|---|
| 16 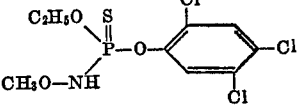 | $n_D^{24}=1.5650$ | 71 |
| 17 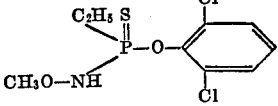 | $n_D^{21}=1.5772$ | 80 |
| 18 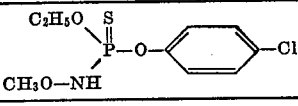 | $n_D^{23}=1.5503$ | 79 |
| 19 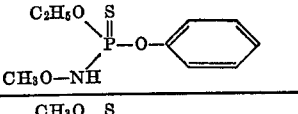 | $n_D^{23}=1.5339$ | 84 |
| 20 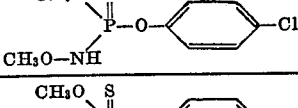 | $n_D^{23}=1.5464$ | 81 |
| 21 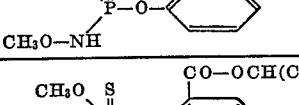 | $n_D^{23}=1.5369$ | 74 |
| 22 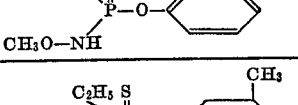 | Fp. 45° C. | 54 |
| 23 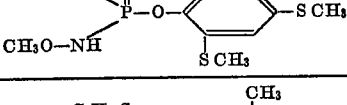 | Fp. 76° C. | 37 |
| 24 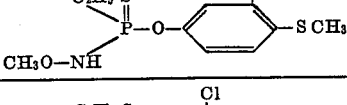 | $n_D^{23}=1.5914$ | 6 |
| 25 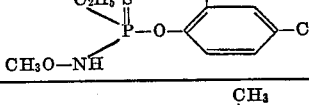 | $n_D^{23}=1.5820$ | 72 |
| 26 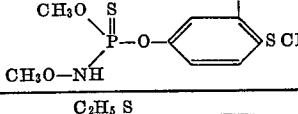 | $n_D^{23}=1.5882$ | 76 |
| 27 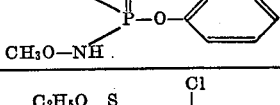 | $n_D^{23}=1.5650$ | 74 |
| 28 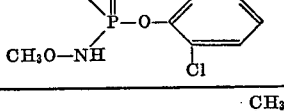 | $n_D^{21}=1.5569$ | 87 |
| 29 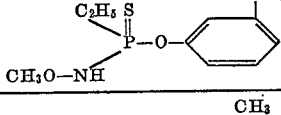 | $n_D^{24}=1.5539$ | 88 |
| 30 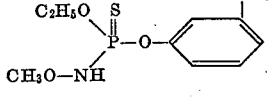 | $n_D^{24}=1.5348$ | 86 |

TABLE—Continued

| Compound | | Physical properties (refractive index, melting point) | Yield (percent of theory) |
|---|---|---|---|
| 31 | C₂H₅O, S, P(=S)(–O–C₆H₄–OCH₃), CH₃O–NH | Fp. 70° C. | 77 |
| 32 | C₂H₅O, S, P(=S)(–O–C₆H₄–CH₃), CH₃O–NH | $n_D^{25}=1.5350$ | 40 |
| 33 | C₂H₅O, S, P(=S)(–O–C₆H₃Cl₂), CH₃O–NH | $n_D^{25}=1.5522$ | 79 |
| 34 | CH₃O, S, P(=S)(–O–C₆H₃Cl₂), CH₃O–NH | $n_D^{23}=1.5542$ | 52 |
| 35 | C₂H₅, S, P(=S)(–O–C₆H₄–Cl), CH₃O–NH | $n_D^{23}=1.5663$ | 79 |
| 36 | C₂H₅O, S, P(=S)(–O–C₆H₃Cl₂), CH₃O–NH | $n_D^{23}=1.5579$ | 66 |
| 37 | C₂H₅O, S, P(=S)(–O–C₆H₂(CH₃)(SCH₃)₂), CH₃O–NH | Fp. 54–56° C. | 72 |

EXAMPLE 6

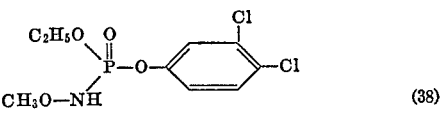

(38)

27 g. (0.33 mole) of O-methylhydroxylammonium chloride and 67 g. (0.66 mole) of triethylamine were dissolved in 500 ml. of chloroform and this solution was added dropwise, at 0 to 5° C., to a solution of 49 g. (0.3 mole) of O-ethylphosphoric acid ester dichloride in 500 ml. of chloroform. Thereafter the mixture was stirred for a further 30 minutes at 20 to 25° C. and 42 g. (0.26 mole) of 3,4-dichlorophenol in 100 ml. of chloroform were then added dropwise. Thereafter 33 g. (0.3 mole) of triethylamine were added dropwise to the reaction mixture of 25° C. The mixture was stirred for a further 4 hours at 25° C. The salt-like precipitate which formed was filtered off and the filtrate was washed with water. After drying the organic phase over sodium sulfate, the solvent was stripped off under reduced pressure and the residue was subjected to "incipient" distillation at 0.1 mm. Hg and 70° C. 58 g. (74% of theory) of O-ethyl-O-(3,4-dichlorophenyl) - N - methoxy-phosphoric acid diester amide were obtained in a crystalline form (melting point 60 to 61° C.).

The following compounds were prepared by methods analogous to that of Example 6:

| Compound | | Physical properties (refractive index, melting point) | Yield (percent of theory) |
|---|---|---|---|
| 39 | C₂H₅O, O, P(=O)(–O–C₆H₃(Cl)–C(CH₃)₃), CH₃O–NH | $n_D^{23}=1.4950$ | 50 |
| 40 | C₂H₅O, O, P(=O)(–O–C₆H₄–Cl), CH₃O–NH | $n_D^{23}=1.5010$ | 68 |
| 41 | C₂H₅O, O, P(=O)(–O–C₆H₅), CH₃O–NH | $n_D^{25}=1.4902$ | 68 |
| 42 | C₂H₅O, O, P(=O)(–O–C₆H₂(CH₃)(SCH₃)₂), CH₃O–NH | Fp. 70–73° C. | 60 |

TABLE—Continued

| Compound | | Physical properties (refractive index, melting point) | Yield (percent of theory) |
|---|---|---|---|
| 43 | 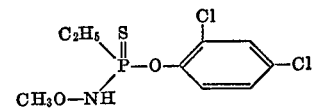 | $n_D^{23}=1.4928$ | 37 |
| 44 | 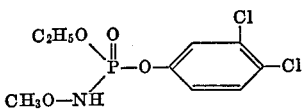 | $n_D^{25}=1.4916$ | 57 |
| 45 | 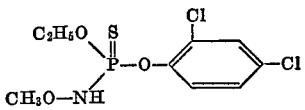 | $n_D^{25}=1.5312$ | 71 |

Other compounds which can be similarly produced include:

O - butyl - O - (3 - nitro - 4 - isopropoxyphenyl) - N-butoxythionophosphoric acid ester amide, O - (4 - isopropylmercaptophenyl) - N - methoxybutanephosphonic acid ester amide, and the like.

It will be appreciated that the instant specification and examples are set forth by way of illustration and not limitation and that various modifications and changes may be made without departing from the spirit and scope of the present invention.

What we claim is:

1. An O - phenyl-N-alkoxy-(thiono)-phosphoric(phosphonic) acid ester amide of the formula:

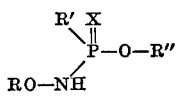

in which
R is alkyl with 1 to 6 carbon atoms,
R' is alkyl or alkoxy with 1 to 6 carbon atoms,
R" is phenyl substituted by at least one of halogen, nitro, lower alkyl, cyano, alkoxy, carbalkoxy and alkylmercapto with 1 to 6 carbon atoms, and
X is oxygen or sulfur.

2. A compound according to claim 1 in which R is lower alkyl, R' is lower alkyl or alkoxy, and R" is phenyl optionally substituted by at least one of chlorine, cyano, methoxy, ethoxy, methylmercapto, ethylmercapto, lower alkyl and carbo-lower alkoxy.

3. The compound according to claim 1 wherein such compound is O-ethyl-O-(3-methyl-4-methylmercaptophenyl)-N-methoxy-thionophosphonic acid diester amide of the formula:

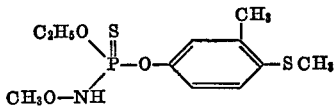

4. The compound according to claim 1 wherein such compound is O-(2,4-dichlorophenyl)-N-methoxy-ethanethionophosphoric acid ester amide of the formula:

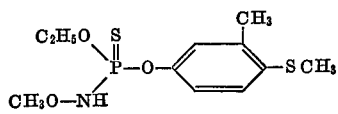

5. The compound according to claim 1 wherein such compound is O-ethyl-(3,4-dichlorophenyl)-N-methoxy-thionophosphoric acid diester amide of the formula:

6. The compound according to claim 1 wherein such compound is O - (4 - chlorophenyl)-N-methoxy-ethanethionophosphonic acid ester amide of the formula:

7. The compound according to claim 1 wherein such compound is O - ethyl - O - (methyl-4-methylcercaptophenyl)-N-methoxy-phosphoric acid diester amide of the formula:

References Cited
UNITED STATES PATENTS
3,711,582   1/1973   Schrader et al. _____ 260—959

LEWIS GOTTS, Primary Examiner

R. L. RAYMOND, Assistant Examiner

U.S. Cl. X.R.

260—940, 941, 951, 954, 959, 984; 424—210, 212, 216, 217, 218, 220

UNITED STATES PATENT OFFICE
CERTIFICATE OF CORRECTION

Patent No. 3,773,861  Dated November 20, 1973

Inventor(s) Wolfgang Hofer et al   Page 1 of 2

It is certified that error appears in the above-identified patent and that said Letters Patent are hereby corrected as shown below:

Col. 3, line 28, change "hydroxyammonium" to -- hydroxylammonium --.

Col. 4, line 46, change "(III)" to -- (II) --.

Col. 5, line 5, correct spelling of "persicae";

line 25, correct spelling of "maculipennis";

line 28, correct spelling of "Agrotis";

line 29, correct spelling of "brassicae";

line 31, correct spelling of "tortrix" (first occurrence).

Col. 9, Comp. 34, Table 1, under "Degree of destruction in percent after 1 day" change "108" to -- 100 --.

Compound 36, Table 1, under heading "Degree of destruction in percent after 1 day" change "90" to -- 99 --.

Compound 14, Table 1, correct formula to read as follows:

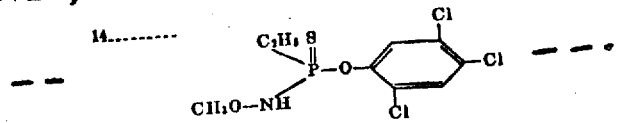

Col. 13, Compound 39, Table 2, in the chemical formula, change
```
 " S "     to --  O --.
   ||              ||
   P               P
```

Column 9, Compound 36, Table 1 under the heading "Degree of Destruction in percent after 1 day", "109" should read -- 100 --.

UNITED STATES PATENT OFFICE
CERTIFICATE OF CORRECTION

Patent No. 3,773,861            Dated

Inventor(s)

It is certified that error appears in the above-identified patent and that said Letters Patent are hereby corrected as shown below:

Col. 16, Table 4, Compound 1, change "$COH_3$" to -- $OCH_3$ --.

Col. 16, Table 4, Compound 37, correct formula to read as follows:

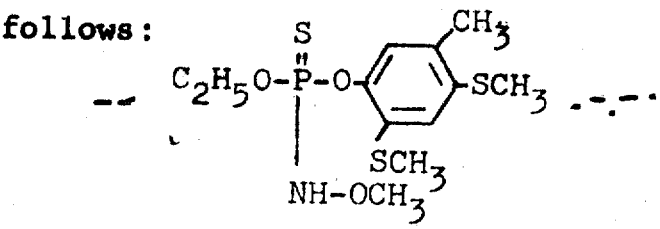

Col. 26, claim 6, correct the formula to read as follows:

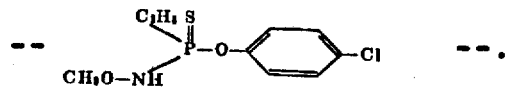

Col. 26, claim 7, correct formula to read as follows:

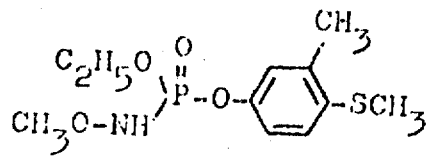

Signed and sealed this 19th day of November 1974.

(SEAL)
Attest:

McCOY M. GIBSON JR.
Attesting Officer

C. MARSHALL DANN
Commissioner of Patents